United States Patent
Yin et al.

(10) Patent No.: US 11,870,362 B2
(45) Date of Patent: Jan. 9, 2024

(54) SYNCHRONOUS RECTIFICATION CONTROL CIRCUIT AND SWITCHING POWER SUPPLY SYSTEM

(71) Applicant: Wuxi Chipown Microelectronics Co., Ltd., Jiangsu (CN)

(72) Inventors: Jian Yin, Jiangsu (CN); Yang Luo, Jiangsu (CN); Haisong Li, Jiangsu (CN)

(73) Assignee: Wuxi Chipown Microelectronics Co., Ltd., Jiangsu (CN)

( * ) Notice: Subject to any disclaimer, the term of this patent is extended or adjusted under 35 U.S.C. 154(b) by 201 days.

(21) Appl. No.: 17/561,280

(22) Filed: Dec. 23, 2021

(65) Prior Publication Data
US 2023/0081053 A1 Mar. 16, 2023

(30) Foreign Application Priority Data
Sep. 15, 2021 (CN) .......................... 202111080810.9

(51) Int. Cl.
*H02M 3/335* (2006.01)
*H02M 1/08* (2006.01)
*H02M 7/217* (2006.01)

(52) U.S. Cl.
CPC ......... *H02M 3/33592* (2013.01); *H02M 1/08* (2013.01); *H02M 7/217* (2013.01)

(58) Field of Classification Search
CPC .... H02M 3/33592; H02M 1/08; H02M 7/217; H02M 1/0038; H02M 1/0051; H02M 1/32
See application file for complete search history.

(56) References Cited

U.S. PATENT DOCUMENTS

| 10,560,012 B1* | 2/2020 | Yang ................. H02M 3/33523 |
| 2007/0081371 A1* | 4/2007 | Wittenbreder, Jr. ... H03K 17/04 363/127 |
| 2011/0226758 A1* | 9/2011 | Qiu .......................... H05B 6/06 219/660 |
| 2015/0124495 A1* | 5/2015 | Kong ................. H02M 3/33592 363/21.14 |
| 2021/0376745 A1* | 12/2021 | Zong ....................... H02M 1/08 |
| 2022/0416675 A1* | 12/2022 | Wei .......................... H02M 1/08 |

* cited by examiner

*Primary Examiner* — Kyle J Moody
(74) *Attorney, Agent, or Firm* — Harness, Dickey & Pierce, P.L.C.

(57) ABSTRACT

Synchronous rectification control circuit and switching power supply system are provided. The circuit includes a sampling circuit, a turn-on comparison circuit, a turn-off comparison circuit, a drive control circuit, an anti-accidental turn-on circuit, wherein the sampling circuit has a first terminal coupled to a first output terminal of a transformer; the anti-accidental turn-on circuit has a first input terminal coupled to a second terminal of the sampling circuit; the turn-on comparison circuit has a first input terminal coupled to the second terminal of the sampling circuit, a second input terminal coupled to an output terminal of the anti-accidental turn-on circuit; the turn-off comparison circuit has an input terminal coupled to the second terminal of the sampling circuit; the drive control circuit has a first input terminal coupled to an output terminal of the turn-on comparison circuit, a second input terminal coupled to an output terminal of the turn-off comparison circuit.

20 Claims, 8 Drawing Sheets ized. An input voltage of the transformer is Vin, and an output voltage of the transformer is Vout.

US 11,870,362 B2

SYNCHRONOUS RECTIFICATION CONTROL CIRCUIT AND SWITCHING POWER SUPPLY SYSTEM

CROSS-REFERENCE TO RELATED APPLICATIONS

The present application claims priority to Chinese patent application No. 202111080810.9, filed on Sep. 15, 2021, and entitled "SYNCHRONOUS RECTIFICATION CONTROL CIRCUIT AND SWITCHING POWER SUPPLY SYSTEM", and the entire disclosure of which is incorporated herein by reference.

TECHNICAL FIELD

The present disclosure generally relates to circuit technology field, and more particularly, to a synchronous rectification control circuit and a switching power supply system.

BACKGROUND

Flyback switching power supply systems possess various advantages, such as simple circuit structure, isolation of input and output voltages, low cost and small size, and have been widely used.

When a flyback switching power supply system is used in an application scenario with a large output current, a traditional secondary rectifier diode may cause a large conduction loss and reverse recovery loss, and reduce efficiency of a power supply system. To reduce the losses caused by the rectifier diode, in some solutions, a switch MOS transistor with extremely low on-resistance is used as the rectifier, which effectively improves the efficiency of the power supply system.

Referring to FIG. 1, a structural diagram of an existing synchronous rectification control circuit is shown. The synchronous rectification control circuit includes a power circuit and a control circuit. The control circuit includes a turn-on comparison circuit 101, a turn-off comparison circuit 102, and a drive control circuit 103. The control circuit further includes a sampling circuit which usually uses an MOS transistor N2 as a sampling MOS transistor. A portion of a source-drain difference of a switch MOS transistor N1 which is lower than a voltage VCC is detected by the sampling MOS transistor N2, thereby obtaining a sampling voltage VDET.

A first terminal of the sampling MOS transistor N2 is coupled to a first output terminal of a transformer, the switch MOS transistor N1 is coupled to the first output terminal of the transformer, and a gate of the switch MOS transistor N1 is coupled to an output terminal of a drive control circuit 103. An input voltage of the transformer is Vin, and an output voltage of the transformer is Vout.

The turn-on comparison circuit 101 generates a turn-on signal SR_ON based on the sampling voltage VDET and outputs it to the drive control circuit 103. The turn-off comparison circuit 102 generates a turn-off signal SR_OFF based on the sampling voltage VDET and outputs it to the drive control circuit 103. The drive control circuit 103 generates a drive signal GATE based on the turn-on signal SR_ON and the turn-off signal SR_OFF and outputs it to the gate of the switch MOS transistor N1 to control a switching state of the switch MOS transistor N1.

However, the existing synchronous rectification control circuit may be turned on accidentally.

SUMMARY

In embodiments of the present disclosure, a synchronous rectification control circuit is provided, which may not be turned on accidentally.

In an embodiment of the present disclosure, a synchronous rectification control circuit is provided, including a sampling circuit, a turn-on comparison circuit, a turn-off comparison circuit, a drive control circuit, and an anti-accidental turn-on circuit, wherein the sampling circuit has a first terminal coupled to a first output terminal of a transformer, and is configured to obtain a sampling voltage; the anti-accidental turn-on circuit has a first input terminal coupled to a second terminal of the sampling circuit, and is configured to generate and output a turn-on enable signal based on the sampling voltage; the turn-on comparison circuit has a first input terminal coupled to the second terminal of the sampling circuit, and a second input terminal coupled to an output terminal of the anti-accidental turn-on circuit, and is configured to generate and output a turn-on signal when receiving the turn-on enable signal; the turn-off comparison circuit has an input terminal coupled to the second terminal of the sampling circuit, and is configured to generate and output a turn-off signal based on the sampling signal; and the drive control circuit has a first input terminal coupled to an output terminal of the turn-on comparison circuit, and a second input terminal coupled to an output terminal of the turn-off comparison circuit, and is configured to generate and output a corresponding drive signal to a power switch transistor coupled to the first output terminal of the transformer based on the turn-on signal and the turn-off signal, to control a switching state of the power switch transistor.

Optionally, the anti-accidental turn-on circuit includes a first transmission gate circuit, a second transmission gate circuit, and a first-stage sub-circuit, wherein the first transmission gate circuit has an input terminal grounded, an output terminal coupled to a second input terminal of the first-stage sub-circuit and an output terminal of the second transmission gate circuit, a first control terminal coupled to a second control terminal of the second transmission gate circuit, and a second control terminal coupled to a first control terminal of the second transmission gate circuit; the second transmission gate circuit has an input terminal provided with a first reference voltage, and an output terminal coupled to the second input terminal of the first stage sub-circuit, wherein a first control signal of the first control terminal of the first transmission gate circuit and a second control signal of the second control terminal of the first transmission gate circuit are determined based on the first reference voltage and the sampling voltage; and the first-stage sub-circuit has a first input terminal coupled to the first input terminal of the anti-accidental turn-on circuit, and an output terminal coupled with the output terminal of the anti-accidental turn-on circuit.

Optionally, the first-stage sub-circuit includes a first comparator, a first inverter, a first NMOS transistor, a first current source, a first capacitor, a fourth comparator and a first D flip-flop, wherein the first comparator has a first input terminal which is the first input terminal of the first-stage sub-circuit, a second input terminal which is the second input terminal of the first-stage sub-circuit, and an output terminal coupled to an input terminal of the first inverter, the first control terminal of the first transmission gate circuit, and the second control terminal of the second transmission gate circuit; the first inverter has an output terminal coupled to a gate of the first NMOS transistor, the second control terminal of the first transmission gate circuit, and the first control terminal of the second transmission gate circuit; the first NMOS transistor has a drain coupled to a second terminal of the first current source, a first terminal of the first capacitor, and a second input terminal of the fourth comparator, and a source grounded; the first capacitor has a second terminal grounded; the first current source has a first terminal provided with a preset power supply voltage; the fourth comparator has a first input terminal provided with a second reference voltage, and an output terminal configured to generate a first turn-on enable sub-signal; and the first D flip-flop has a clock signal input terminal coupled to the output terminal of the fourth comparator, a D terminal provided with a preset signal, and a Q terminal coupled to the output terminal of the first stage sub-circuit, wherein the first turn-on enable sub-signal is output via the Q terminal to obtain the turn-on enable signal.

Optionally, the anti-accidental turn-on circuit has the second input terminal coupled to the first output terminal of the transformer, and a third input terminal coupled to a second output terminal of the transformer, and is configured to determine to generate the turn-on enable signal based on output voltages of the first output terminal and the second output terminal of the transformer.

Optionally, the anti-accidental turn-on circuit includes a second-stage sub-circuit, a first voltage dividing resistor, a second voltage dividing resistor, a third voltage dividing resistor, a fourth voltage dividing resistor, and OR gate circuit, wherein the first voltage dividing resistor has a first terminal coupled to the second input terminal of the anti-accidental turn-on circuit, and a second terminal coupled to the first input terminal of the second stage sub-circuit, and a first terminal of the second voltage dividing resistor; the second voltage dividing resistor has a second terminal grounded; the third voltage dividing resistor has a first terminal coupled to the third input terminal of the anti-accidental turn-on circuit, and a second terminal coupled to a first terminal of the fourth voltage dividing resistor, wherein a voltage at the second terminal of the third voltage dividing resistor is a first dividing voltage; the fourth voltage dividing resistor has a second terminal grounded; the second-stage sub-circuit has a second input terminal provided with the first dividing voltage, and an output terminal coupled to a second input terminal of the OR gate circuit; and the OR gate circuit has a first input terminal coupled to the output terminal of the second-stage sub-circuit, and an output terminal coupled to the output terminal of the anti-accidental turn-on circuit.

Optionally, the second-stage sub-circuit includes a second comparator, a second inverter, a second NMOS transistor, a second current source, a second capacitor, a fifth comparator and a second D flip-flop, wherein the second comparator has a first input terminal which is the first input terminal of the second-stage sub-circuit, and a second input terminal which is the second input terminal of the second-stage sub-circuit; the second inverter has an input terminal coupled to an output terminal of the second comparator; the second NMOS transistor has a gate coupled to an output terminal of the second inverter, a drain coupled to a second terminal of the second current source, a second input terminal of the fifth comparator, and a first terminal of the second capacitor, and a source grounded; the second current source has a first terminal provided with a preset power supply voltage; the second capacitor has a second terminal grounded; the fifth comparator has a first input terminal provided with a third reference voltage; the second D flip-flop has a clock signal input terminal coupled to an output terminal of the fifth comparator, a D terminal provided with a preset signal, and a Q terminal coupled to the output terminal of the second stage sub-circuit.

Optionally, the anti-accidental turn-on circuit further includes a third-stage sub-circuit and a fifth voltage dividing resistor, and the OR gate circuit further has a third input terminal, wherein the fifth voltage dividing resistor has a first terminal coupled to the second terminal of the fourth voltage dividing resistor, and a second terminal grounded, wherein a voltage at the first terminal of the fifth voltage dividing resistor is the second dividing voltage; and the third-stage sub-circuit has a first input terminal coupled to the second terminal of the first voltage dividing resistor, a second input terminal provided with the second dividing voltage, and an output terminal coupled to the third input terminal of the OR gate circuit.

Optionally, the third-stage sub-circuit includes a third comparator, a third inverter, a third NMOS transistor, a third current source, a third capacitor, a sixth comparator and a third D flip-flop, wherein the third comparator has a first input terminal which is the first input terminal of the third-stage sub-circuit, and a second input terminal which is the second input terminal of the third-stage sub-circuit; the third inverter has an input terminal coupled to an output terminal of the third comparator; the third NMOS transistor has a gate coupled to the output terminal of the third inverter, a drain coupled to a second terminal of the third current source, a second input terminal of the sixth comparator, and a first terminal of the third capacitor, and a source grounded; the third current source has a first terminal provided with a preset power supply voltage; the third capacitor has a second terminal grounded; the sixth comparator has a first input terminal provided with a fourth reference voltage; the third D flip-flop has a clock signal input terminal coupled to an output terminal of the sixth comparator, a D terminal provided with a preset signal, and a Q terminal coupled to the output terminal of the third-stage sub-circuit.

Optionally, the synchronous rectification control circuit further includes a light-load detection circuit, wherein the light-load detection circuit has an input terminal coupled to the second terminal of the sampling circuit, and a first output terminal coupled to the third input terminal of the turn-on comparison circuit, the fourth input terminal of the anti-accidental turn-on circuit, and the second input terminal of the turn-off comparison circuit, and is configured to determine whether to generate a light-load signal to the turn-on comparison circuit, the anti-accidental turn-on circuit and the turn-off comparison circuit based on a switching frequency of the sampling voltage; and the turn-on comparison circuit, the anti-accidental turn-on circuit and the turn-off comparison circuit enter a dormant state after receiving the light-load signal.

Optionally, the light-load detection circuit includes a pre-pulse signal generation circuit, a pulse signal generation circuit and a light-load signal generation circuit, wherein the pre-pulse signal generation circuit has an input terminal coupled to the second terminal of the sampling circuit, and is configured to generate and output a pre-pulse signal based on that a duration of a high level of the sampling voltage reaches a first preset duration; the pulse signal generation circuit has an input terminal coupled to the input terminal of the pre-pulse signal generation circuit, and is configured to convert the pre-pulse signal into a pulse signal; the light-load signal generation circuit has an input terminal coupled to an output terminal of the pre-pulse signal generation circuit, and is configured to generate and output the light-load signal based on that the number of times of receiving the pulse signal reaches a second preset value.

Optionally, the pre-pulse signal generation circuit includes a first Schmitt trigger, a fourth current source, a fourth NMOS transistor, a fifth NMOS transistor, a fourth capacitor, a seventh comparator and a first counter, where the first Schmitt trigger has an input terminal provided with the sampling voltage, and an output terminal coupled to a gate of the fourth NMOS transistor and a control terminal of the first counter; the fourth NMOS transistor has a drain coupled to a second terminal of the fourth current source and a second input terminal of the seventh comparator, and a source grounded; the fourth current source has a first terminal provided with a preset power supply voltage; the fifth NMOS transistor has a gate coupled to an output terminal of the seventh comparator, a drain coupled to a second input terminal of the seventh comparator, and a source grounded; the fourth capacitor has a first terminal coupled to the second input terminal of the seventh comparator, and a second terminal grounded; the seventh comparator has a first input terminal provided with a fifth reference voltage, and an output terminal coupled to an input terminal of the first counter; the first counter has an output terminal coupled to the output terminal of the pre-pulse signal generation circuit; the pre-pulse signal generation circuit is configured to output the pre-pulse signal when a count value of the first counter reaches a first preset value.

Optionally, the pulse signal generation circuit includes a fifth inverter, a first delay circuit and a second NAND gate circuit, wherein the fifth inverter has an input terminal coupled to the input terminal of the pulse signal generation circuit, and an output terminal coupled to a first input terminal of the second NAND gate circuit and a first terminal of the first delay circuit; the first delay circuit has a second terminal coupled to a second input terminal of the second NAND gate circuit; and the second NAND gate circuit has an output terminal coupled to the output terminal of the pulse signal generation circuit.

Optionally, the light-load signal generation circuit includes a sixth inverter and a second counter, wherein the sixth inverter has an input terminal which is the input terminal of the light-load signal generation circuit, and an output terminal coupled to an input terminal of the second counter; the second counter has an output terminal coupled to the output terminal of the light-load signal generation circuit; the light-load signal generation circuit is configured to generate and output the light-load signal when a count value of the second counter reaches a second preset value.

Optionally, the light-load signal generation circuit further includes a detection trigger sub-circuit having an input terminal provided with the sampling voltage, a control terminal coupled to the output terminal of the pulse signal generation circuit, a first output terminal coupled to a control terminal of the second counter, and a second output terminal coupled to the output terminal of the light-load signal generation circuit; and the detection trigger sub-circuit is configured to output a first trigger signal to the control terminal of the second counter based on that the number of consecutive times that the sampling voltage is a low level reaches a third preset value, and output a second trigger signal, after detecting the generation of the light-load signal and when the number of consecutive times that the sampling voltage is a low level reaches a fourth preset value, so that the light-load signal generation circuit stops generating the light-load signal.

Optionally, the detection trigger sub-circuit includes a second Schmitt trigger, a seventh inverter and a third counter, wherein the second Schmitt trigger has an input terminal provided with the sampling voltage, and an output terminal coupled to an input terminal of the seventh inverter; the seventh inverter has an output terminal coupled to an input terminal of the third counter; the third counter has a control terminal coupled to the output terminal of the pre-pulse signal generation circuit, a first output terminal which is the first output terminal of the detection trigger sub-circuit, and a second output terminal which is the second output terminal of the detection trigger sub-circuit.

In an embodiment of the present disclosure, a switching power supply system is provided, including any one of the above synchronous rectification control circuits.

Embodiments of the present disclosure may provide following advantages.

An accidental turn-on circuit is provided in the synchronous rectification control circuit, where the accidental turn-on circuit generates a turn-on enable signal based on the sampling voltage and outputs it to the turn-on comparison circuit. The turn-on comparison circuit generates the turn-on signal after receiving the turn-on enable signal, thereby effectively avoiding an accidental turn-on of the synchronous rectification control circuit.

Further, the synchronous rectification control circuit also includes a light-load detection circuit which determines whether to generate a light-load signal by detecting a switching frequency of the sampling voltage, and outputs the generated light-load signal to the turn-on comparison circuit, the accidental turn-on circuit and the turn-off comparison circuit, after determining that the light-load signal is generated, so as to control the turn-on comparison circuit, the accidental turn-on circuit and the turn-off comparison circuit to enter a dormant state, thereby saving power consumption of the synchronous rectification control circuit.

DETAILED DESCRIPTION

Figure 1:
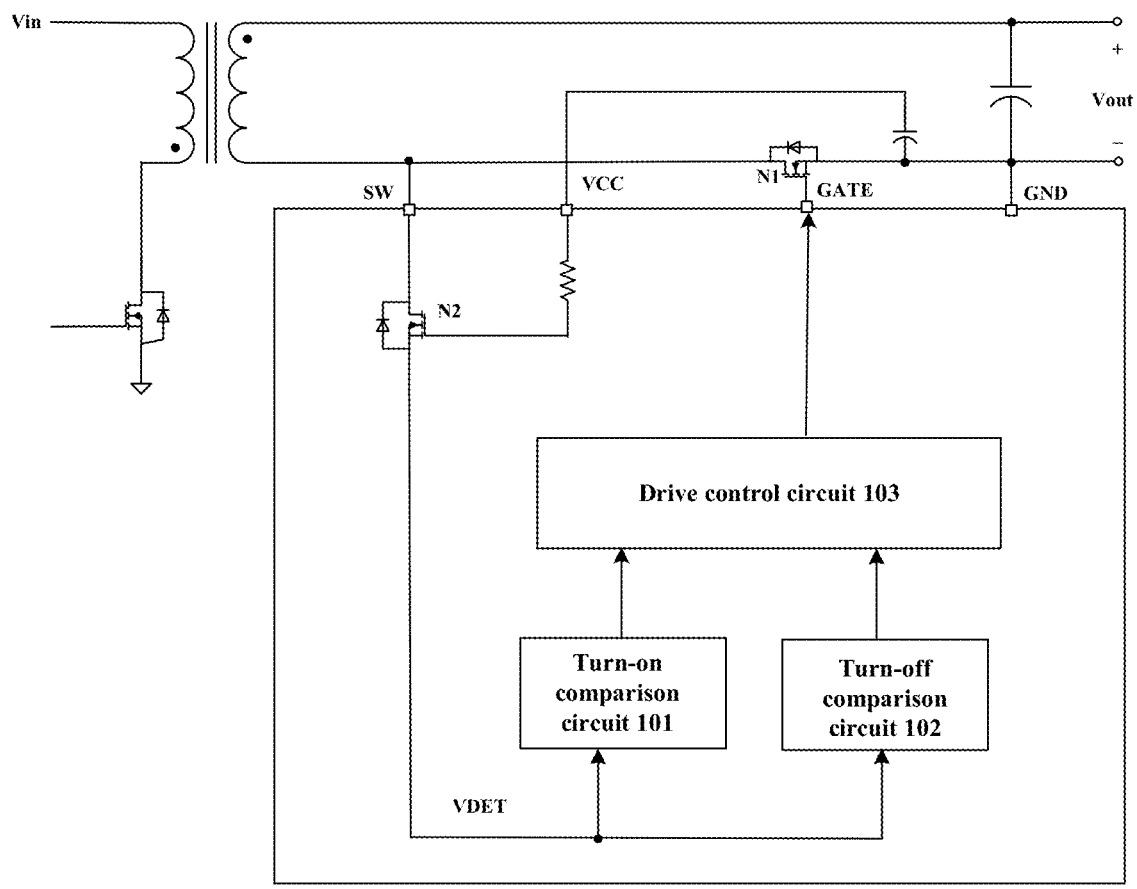
FIG. 1 schematically illustrates a structural diagram of an existing synchronous rectification control circuit.

Referring to FIG. 1, in existing techniques, the turn-on comparison circuit distinguishes a high plateau waveform and a ringing waveform of the sampling voltage VDET based on a difference in areas thereof to generate a turn-on signal. However, in some special application scenarios, the difference in areas of the high plateau waveform and the ringing waveform of the sampling voltage VDET is relatively small, resulting in an accidental turn-on.

In embodiments of the present disclosure, an accidental turn-on circuit is provided in the synchronous rectification control circuit, where the accidental turn-on circuit generates a turn-on enable signal based on the sampling voltage and outputs it to the turn-on comparison circuit. The turn-on comparison circuit generates the turn-on signal after receiving the turn-on enable signal, thereby effectively avoiding an accidental turn-on of the synchronous rectification control circuit.

In order to clarify the object, solutions and advantages of embodiments of the present disclosure, embodiments of present disclosure will be described clearly in detail in conjunction with accompanying drawings.

Figure 2:
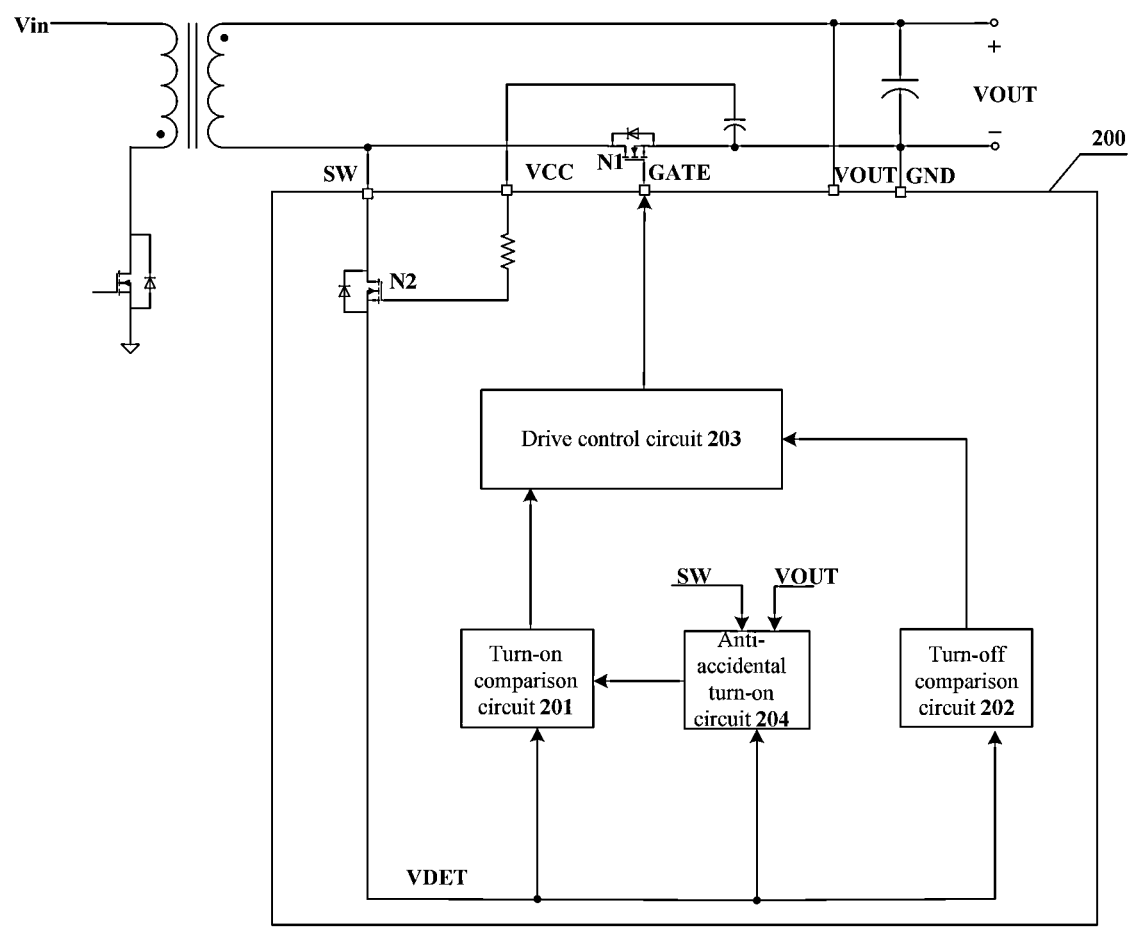
FIG. 2 schematically illustrates a structural diagram of a synchronous rectification control circuit according to an embodiment.

FIG. 2 schematically illustrates a structural diagram of a synchronous rectification control circuit 200 according to an embodiment. Referring to FIG. 2, the synchronous rectification control circuit 200 may include a sampling circuit, a turn-on comparison circuit 201, a turn-off comparison circuit 202, a drive control circuit 203, and an anti-accidental turn-on circuit 204.

The sampling circuit has a first terminal coupled to a first output terminal of a transformer, and is configured to obtain a sampling voltage VDET.

The anti-accidental turn-on circuit 204 has a first input terminal coupled to a second terminal of the sampling circuit, and is configured to generate and output a turn-on enable signal based on the sampling voltage.

The turn-on comparison circuit 201 has a first input terminal coupled to the second terminal of the sampling circuit, and a second input terminal coupled to an output terminal of the anti-accidental turn-on circuit 204, and is configured to generate and output a turn-on signal when receiving the turn-on enable signal.

The turn-off comparison circuit 202 has an input terminal coupled to the second terminal of the sampling circuit, and is configured to generate and output a turn-off signal based on the sampling signal.

The drive control circuit 203 has a first input terminal coupled to an output terminal of the turn-on comparison circuit 201, and a second input terminal coupled to an output terminal of the turn-off comparison circuit 202, and is configured to generate and output a corresponding drive signal to a power switch transistor coupled to the first output terminal of the transformer based on the turn-on signal and the turn-off signal, to control a switching state of the power switch transistor.

Figure 3:
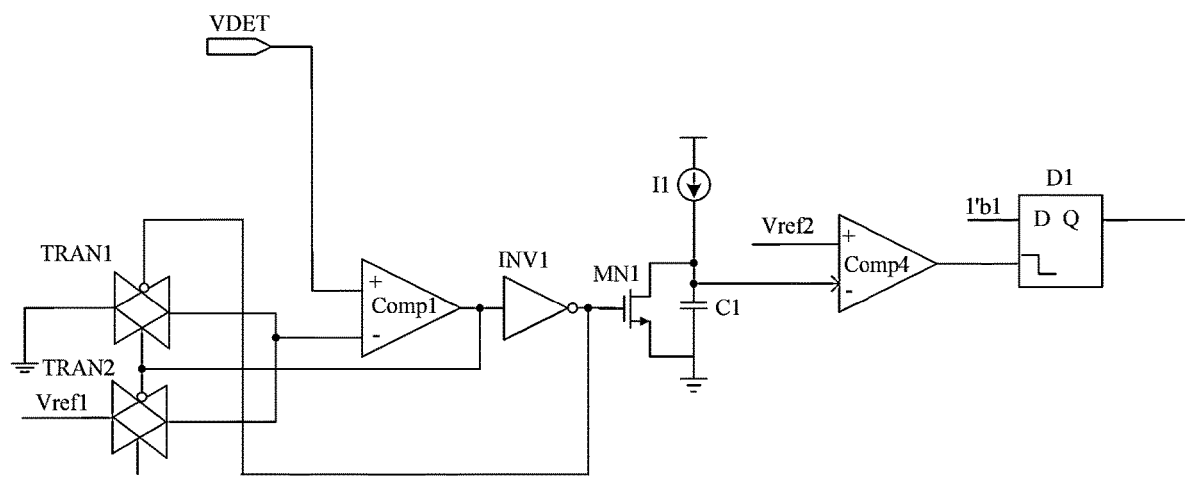
FIG. 3 schematically illustrates a structural diagram of an anti-accidental turn-on circuit according to an embodiment.

FIG. 3 schematically illustrates a structural diagram of an anti-accidental turn-on circuit according to an embodiment.

Referring to FIG. 3, in some embodiments, the anti-accidental turn-on circuit 204 includes a first transmission gate TRAN1 circuit, a second transmission gate TRAN2 circuit, and a first-stage sub-circuit.

The first transmission gate TRAN1 circuit has an input terminal grounded, an output terminal coupled to a second input terminal of the first-stage sub-circuit and an output terminal of the second transmission gate TRAN2 circuit, a first control terminal coupled to a second control terminal of the second transmission gate TRAN2 circuit, and a second control terminal coupled to a first control terminal of the second transmission gate TRAN2 circuit.

The second transmission gate TRAN2 circuit has an input terminal provided with a first reference voltage Vref1, an output terminal coupled to the second input terminal of the first stage sub-circuit and the output terminal of the first transmission gate TRAN1 circuit, a first control terminal coupled to the second control terminal of the first transmission gate TRAN1 circuit, and a second control terminal coupled to the first control terminal of the first transmission gate TRAN1 circuit. Input signals at the first control terminal of the first transmission gate TRAN1 circuit and the second control terminal of the second transmission gate TRAN2 circuit are relevant to the first reference voltage Vref1 and the sampling voltage VDET.

The first-stage sub-circuit has a first input terminal coupled to the output terminal of the sampling circuit, and is configured to receive the sampling voltage VDET, a second input terminal capable of strobing an input ground potential or the first reference voltage Vref1, and an output terminal coupled with the output terminal of the anti-accidental turn-on circuit 204.

In some embodiments, the first control terminal of the first transmission gate TRAN1 circuit is a C terminal, and the second control terminal of the first transmission gate TRAN1 circuit is a terminal reverse to the C terminal. The first control terminal of the second transmission gate TRAN2 circuit is the C terminal, and the second control terminal of the second transmission gate TRAN2 circuit is a terminal reverse to the C terminal.

In some embodiments, the first-stage sub-circuit includes a first comparator Comp1, a first inverter INV1, a first NMOS transistor MN1, a first current source I1, a first capacitor C1, a fourth comparator Comp4 and a first D flip-flop D1.

The first comparator Comp1 has a first input terminal which is the first input terminal of the first-stage sub-circuit, a second input terminal which is the second input terminal of the first-stage sub-circuit, and an output terminal coupled to an input terminal of the first inverter INV1, the first control terminal of the first transmission gate TRAN1 circuit, and the second control terminal of the second transmission gate TRAN2 circuit.

The first inverter INV1 has an output terminal coupled to a gate of the first NMOS transistor MN1, the second control terminal of the first transmission gate TRAN1 circuit, and the first control terminal of the second transmission gate TRAN2 circuit.

The first NMOS transistor MN1 has a drain coupled to a second terminal of the first current source I1, a first terminal of the first capacitor C1, and a second input terminal of the fourth comparator Comp4, and a source coupled to a second terminal of the first capacitor C1 and the ground.

The first capacitor C1 is coupled between the drain and the source of the first NMOS transistor MN1. The first current source I1 has a first terminal provided with a preset power supply voltage.

The fourth comparator Comp4 has a first input terminal provided with a second reference voltage Vref2, and an output terminal configured to generate a first turn-on enable sub-signal.

The first D flip-flop D1 has a clock signal input terminal coupled to the output terminal of the fourth comparator Comp 4, a D terminal provided with a preset signal 1'b1, and a Q terminal coupled to the output terminal of the first stage sub-circuit.

In some embodiments, the anti-accidental turn-on circuit 204 may include multiple sub-circuits. The anti-accidental turn-on circuit 204 may further include a second input terminal and a third input terminal. The second input terminal of the anti-accidental turn-on circuit 204 may be coupled to the first output terminal of the transformer, and the third input terminal of the anti-accidental turn-on circuit 204 may be coupled to the second output terminal of the transformer. The anti-accidental turn-on circuit 204 may determine to generate a turn-on enable signal based on output voltages of the first output terminal and the second output terminal of the transformer.

Figure 4:
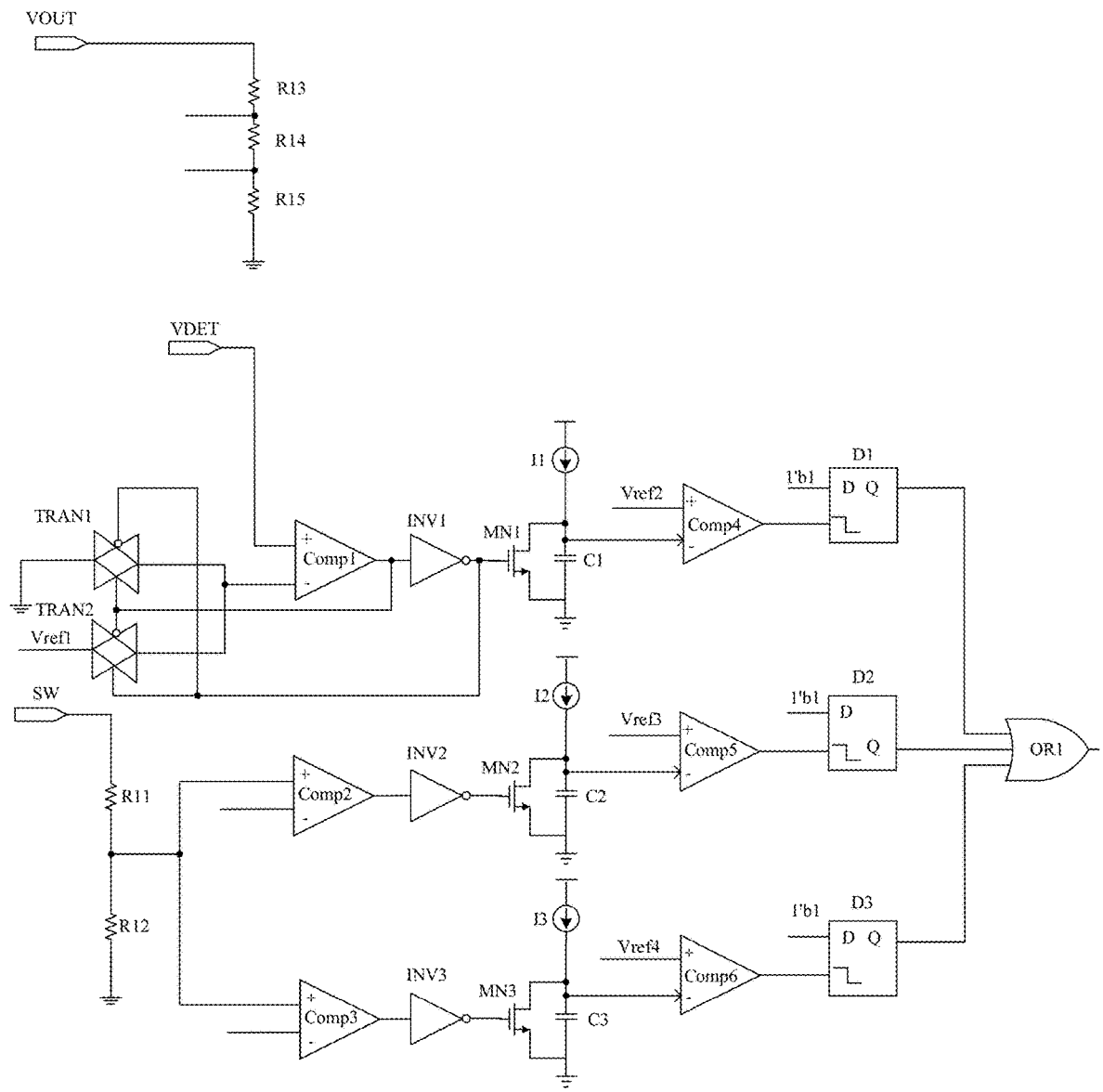
FIG. 4 schematically illustrates a structural diagram of an anti-accidental turn-on circuit according to an embodiment.

FIG. 4 schematically illustrates a structural diagram of an anti-accidental turn-on circuit according to an embodiment.

In some embodiments, the anti-accidental turn-on circuit 204 includes a second-stage sub-circuit, a first voltage dividing resistor R11, a second voltage dividing resistor R12, a third voltage dividing resistor R13, a fourth voltage dividing resistor R14, and an OR gate circuit.

The second-stage sub-circuit has a first input terminal coupled with a second terminal of the first voltage dividing resistor R11, a second input terminal provided with the first dividing voltage, and an output terminal coupled to a second input terminal of the OR gate circuit.

The first voltage dividing resistor R11 and the second voltage dividing resistor R12 constitute a voltage dividing network. The first voltage dividing resistor R11 has a first terminal coupled to the first terminal of the sampling circuit, and a second terminal coupled to a first terminal of the second voltage dividing resistor R12. The second voltage dividing resistor R12 has a second terminal grounded.

The third voltage dividing resistor R13 and the fourth voltage dividing resistor R14 constitute a voltage dividing network. The third voltage dividing resistor R13 has a first terminal coupled to the third input terminal of the anti-accidental turn-on circuit 204, and a second terminal coupled to a first terminal of the fourth voltage dividing resistor R14, wherein a voltage at the second terminal of the third voltage dividing resistor R13 is a first dividing voltage. The fourth voltage dividing resistor R14 has a second terminal grounded.

The OR gate circuit has two input terminals where a first input terminal is coupled to the output terminal of the second-stage sub-circuit, and an output terminal coupled to the output terminal of the anti-accidental turn-on circuit 204.

In some embodiments, the second-stage sub-circuit includes a second comparator Comp2, a second inverter INV2, a second NMOS transistor MN2, a second current source I2, a second capacitor C2, a fifth comparator Comp5 and a second D flip-flop D2.

The second comparator Comp2 has a first input terminal which is the first input terminal of the second-stage sub-circuit, a second input terminal which is the second input terminal of the second-stage sub-circuit, and an output terminal coupled to an input terminal of the second inverter INV2.

The second inverter INV2 has an output terminal coupled to a gate of the second NMOS transistor MN2.

The second NMOS transistor MN2 has a drain coupled to a second terminal of the second current source I2, a second input terminal of the fifth comparator Comp5, and a first terminal of the second capacitor C2, and a source coupled to a second terminal of the second capacitor C2 and the ground.

The second capacitor C2 is coupled between the drain and the source of the second NMOS transistor MN2. The second current source I2 has a first terminal provided with a preset power supply voltage.

The fifth comparator Comp5 has a first input terminal provided with a third reference voltage Vref3, and an output terminal generating a second turn-on enable sub-signal.

The second D flip-flop D2 has a clock signal input terminal coupled to the output terminal of the fifth comparator Comp 5, a D terminal provided with a preset signal, and a Q terminal coupled to the output terminal of the second stage sub-circuit.

In some embodiments, the anti-accidental turn-on circuit 204 further includes a third-stage sub-circuit and a fifth voltage dividing resistor, and the OR gate circuit further has a third input terminal.

The third-stage sub-circuit has a first input terminal coupled to the second terminal of the first voltage dividing resistor R11, a second input terminal provided with the second dividing voltage, and an output terminal coupled to the third input terminal of the OR gate circuit.

The OR gate circuit OR1 has three input terminals, and is configured to execute an OR operation on outputs of the first-stage sub-circuit, the second-stage sub-circuit and the third-stage sub-circuit, and generate and output the turn-on enable signal based on a result of the OR operation.

The third voltage dividing resistor R13, the fourth voltage dividing resistor R14 and the fifth voltage dividing resistor R15 constitute a voltage dividing network. The fifth voltage dividing resistor R15 has a first terminal coupled to the second terminal of the fourth voltage dividing resistor R14, and a second terminal grounded, wherein a voltage at the first terminal of the fifth voltage dividing resistor R15 is the second dividing voltage.

In some embodiments, the third voltage dividing resistor R13 has a first terminal provided with an output voltage of the transformer, and a second terminal coupled to the first terminal of the fourth voltage dividing resistor R14. The fourth voltage dividing resistor R14 has a second terminal coupled to the first terminal of the fifth voltage dividing resistor R15. The fifth voltage dividing resistor R15 has a second terminal grounded.

In some embodiments, the third-stage sub-circuit includes a third comparator Comp3, a third inverter INV3, a third NMOS transistor MN3, a third current source I3, a third capacitor C3, a sixth comparator Comp6 and a third D flip-flop D3.

The third comparator Comp3 has a first input terminal which is the first input terminal of the third-stage sub-circuit, a second input terminal which is the second input terminal of the third-stage sub-circuit, and an output terminal coupled to an input terminal of the third inverter INV3.

The third inverter INV3 has an output terminal coupled to a gate of the third NMOS transistor MN3.

The third NMOS transistor MN3 has a drain coupled to a second terminal of the third current source I3, a second input terminal of the sixth comparator Comp6, and a first terminal of the third capacitor C3, and a source coupled to a second terminal of the third capacitor C3 and the ground.

The third capacitor C3 is coupled between the drain and the source of the third NMOS transistor MN3. The third current source I3 has a first terminal provided with a preset power supply voltage.

The sixth comparator Comp6 has a first input terminal provided with a fourth reference voltage Vref4, and an output terminal generating a second turn-on enable sub-signal.

The third D flip-flop D3 has a clock signal input terminal coupled to an output terminal of the sixth comparator Comp6, a D terminal provided with a preset signal, and a Q terminal coupled to the output terminal of the third-stage sub-circuit.

In some embodiments, the anti-accidental turn-on circuit 204 may merely include the above-mentioned first-stage sub-circuit, or merely include the above-mentioned first-stage sub-circuit and the second-stage sub-circuit, or include the above-mentioned first-stage sub-circuit, second-stage sub-circuit and third-stage sub-circuit. The anti-accidental turn-on circuit 204 may further include a fourth-stage sub-circuit or more stage sub-circuits which may have a structure similar as the above-mentioned second-stage sub-circuit or third-stage sub-circuit.

In the embodiments of the present disclosure, the first input terminal of the comparator is a positive input terminal of the comparator, and the second input terminal of the comparator is a negative input terminal of the comparator. For example, the first input terminal of the first comparator Comp1 is the "+" terminal of the first comparator Comp1, and the second input terminal of the first comparator Comp1 is the "−" terminal of the first comparator Comp1.

A working principle of the anti-accidental turn-on circuit 204 provided in the above embodiments is described in conjunction with FIG. 4 below.

The first input terminal of the first comparator Comp1 is provided with the sampling voltage VDET, and the second input terminal of the first comparator Comp1 strobes a ground potential or the first reference voltage Vref1. When the sampling voltage VDET is higher than the first reference voltage Vref1, the gate of the first NMOS transistor MN1 is at a low potential. In this case, the second input terminal of the first comparator Comp1 strobes the ground potential, and the first current source I1 charges the first capacitor C1. When the voltage of the first terminal of the first capacitor C1 reaches the second reference voltage Vref2, the output terminal of the fourth comparator Comp4 outputs a low level, and the first D flip-flop D1 outputs a high level. At this time, the turn-on enable signal is a high level.

During a charging process of the first capacitor C1, if the sampling voltage VDET is lower than 0, the gate of the first NMOS transistor MN1 is at a high potential, charges accumulated on the first capacitor C1 are cleared, and charge accumulation needs to be performed again, that is, the first capacitor C1 is recharged by the first current source I1.

The first input terminal of the second comparator Comp2 receives a resistive divided voltage of n3*SW, where SW is the output voltage of the first output terminal of the transformer. The second input terminal of the second comparator Comp2 receives a resistive divided voltage of n1*Vout, where Vout is the output voltage of the second output terminal of the transformer. When n3*SW>n1*Vout, the gate of the second NMOS transistor MN2 is at a low potential, and the second current source I2 charges the second capacitor C2. When the voltage of the first terminal of the second capacitor C2 reaches the third reference voltage Vref3, the third D flip-flop D3 outputs a high level. At this time, the turn-on enable signal is a high level.

During a charging process of the second capacitor C2, if n3*SW<n1*Vout, the gate of the second NMOS transistor MN2 is at a high potential, charges accumulated on the second capacitor C2 are cleared, and charge accumulation needs to be performed again. That is, the second capacitor C2 is recharged by the second current source I2.

The first input terminal of the third comparator Comp3 receives a resistive divided voltage n3*SW, and the second input terminal of the third comparator Comp3 receives a resistive divided voltage n2*Vout. When n3*SW>n2*Vout, the gate of the third NMOS transistor MN3 is at a low potential, and the third current source I3 charges the third capacitor C3. When the voltage of the first terminal of the third capacitor C3 reaches the fourth reference voltage Vref4, the fourth D flip-flop D4 outputs a high level. At this time, the turn-on enable signal is a high level.

During a charging process of the third capacitor C3, if n3*SW<n2*Vout, the gate of the third NMOS transistor MN3 is at a high potential, charges accumulated on the third capacitor C3 are cleared, and charge accumulation needs to be performed again. That is, the third capacitor C3 is recharged by the third current source I3.

It can be seen from FIG. 4 that when any one of the first D flip-flop D1, the second D flip-flop D2 and the third D flip-flop D3 is at a high level, the OR gate circuit outputs a high level, thereby generating the turn-on enable signal.

Figure 5:
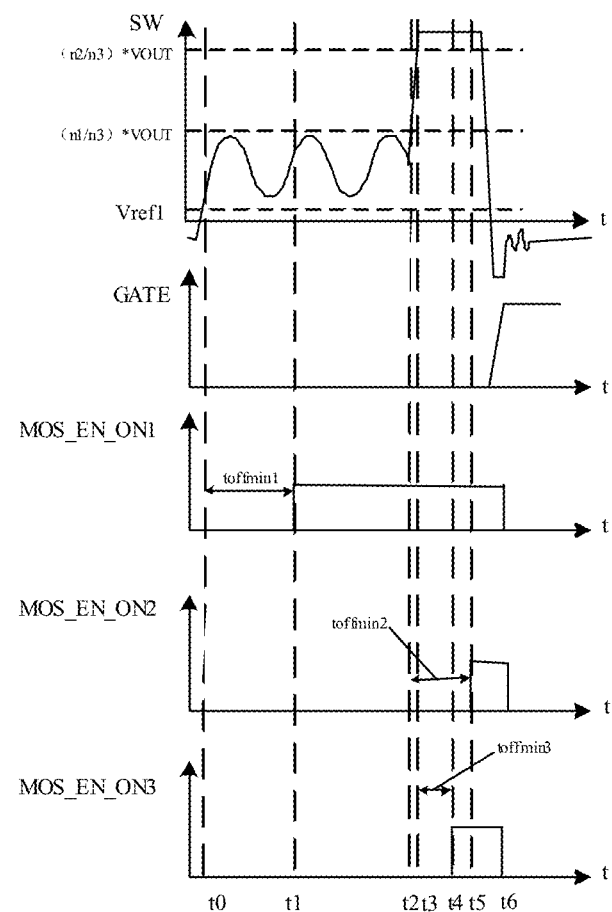
FIG. 5 schematically illustrates a waveform diagram of an anti-accidental turn-on circuit during operation according to an embodiment.

FIG. 5 schematically illustrates a waveform diagram of an anti-accidental turn-on circuit during operation according to an embodiment.

Referring to FIG. 5, at time t0, SW is higher than the first reference voltage Vref1, and the minimum turn-off time of toffmin1 starts to count. At time t1, the sampling voltage VDET being higher than the first reference voltage Vref1 lasts for a certain period, and the output terminal of the fourth comparator Comp4 outputs a high level MOS_E-N_ON1. At time t2, SW>(n1/n3)*Vout, the minimum turn-off time of toffmin2 starts to count. At time t3, SW>(n2/n3)*Vout, the minimum turn-off time of toffmin3 starts to count. At time t4, SW>(n2/n3)*Vout lasts for a period, the output terminal of the sixth comparator Comp6 outputs a high level MOS_EN_ON3. At time t5, SW>(n1/n3)*Vout lasts for a period, and the output terminal of the fifth comparator Comp5 outputs a high level MOS_EN_ON2. At time t6, as MOS_EN_ON1, MOS_EN_ON2 and MOS_EN_ON3 are all high levels, the anti-accidental turn-on circuit 204 generates the turn-on enable signal.

In some embodiments, the synchronous rectification control circuit 200 further includes a light-load detection circuit.

In some embodiments, the light-load detection circuit has an input terminal coupled to the second terminal of the sampling circuit, and a first output terminal coupled to the third input terminal of the turn-on comparison circuit 201, the fourth input terminal of the anti-accidental turn-on circuit 204, and the second input terminal of the turn-off comparison circuit 202. The light-load detection circuit is configured to obtain a switching frequency of the sampling voltage VDET, and determine whether to generate a light-load signal based on the switching frequency of the sampling voltage VDET. If the light-load detection circuit outputs the light-load signal, the turn-on comparison circuit 201, the anti-accidental turn-on circuit 204 and the turn-off comparison circuit 202 enter a dormant state after receiving the light-load signal, so as to reduce power consumption of the synchronous rectification control circuit 200.

Figure 6:
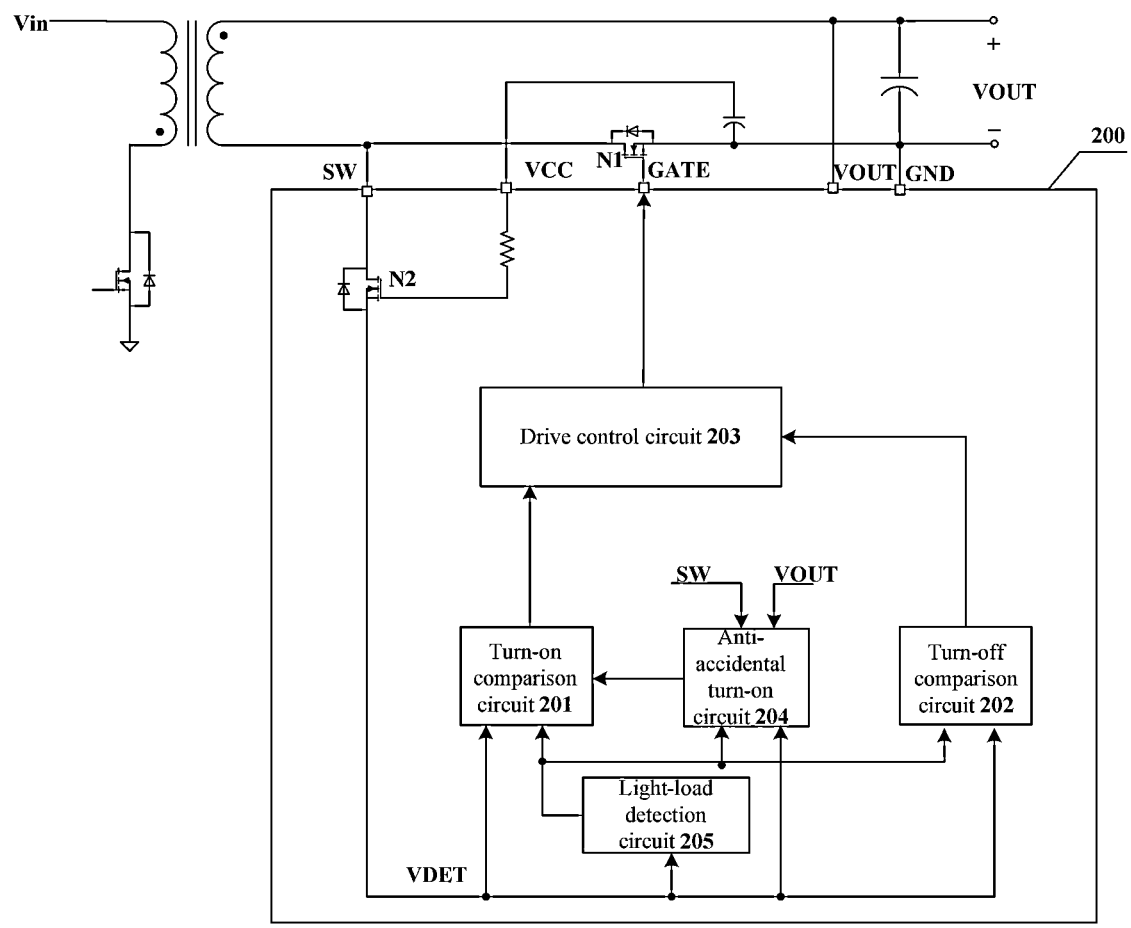
FIG. 6 schematically illustrates a structural diagram of a synchronous rectification control circuit according to an embodiment.

FIG. 6 schematically illustrates a structural diagram of a synchronous rectification control circuit 200 according to an embodiment. Different from FIG. 2, the synchronous rectification control circuit 200 in FIG. 6 further includes a light-load detection circuit 205. Details are provided below in conjunction with FIG. 6.

In some embodiments, the light-load detection circuit 205 includes a pre-pulse signal generation circuit, a pulse signal generation circuit and a light-load signal generation circuit.

The pre-pulse signal generation circuit has an input terminal provided with the sampling voltage VDET, and an output terminal coupled with a control terminal of the pulse signal generation circuit, and is configured to generate and output a pre-pulse signal based on that a duration of a high level of the sampling voltage VDET reaches a first preset duration.

The pulse signal generation circuit has an input terminal provided with the pre-pulse signal, and an output terminal coupled to a first terminal of the light-load signal generation circuit, and is configured to generate and output a pulse signal to the first terminal of the light-load signal generation circuit based on the pre-pulse signal.

The light-load signal generation circuit has an output terminal coupled to an output terminal of the light-load detection circuit, and is configured to generate and output the light-load signal based on that the number of times of receiving the pulse signal reaches a second preset value.

Figure 7:
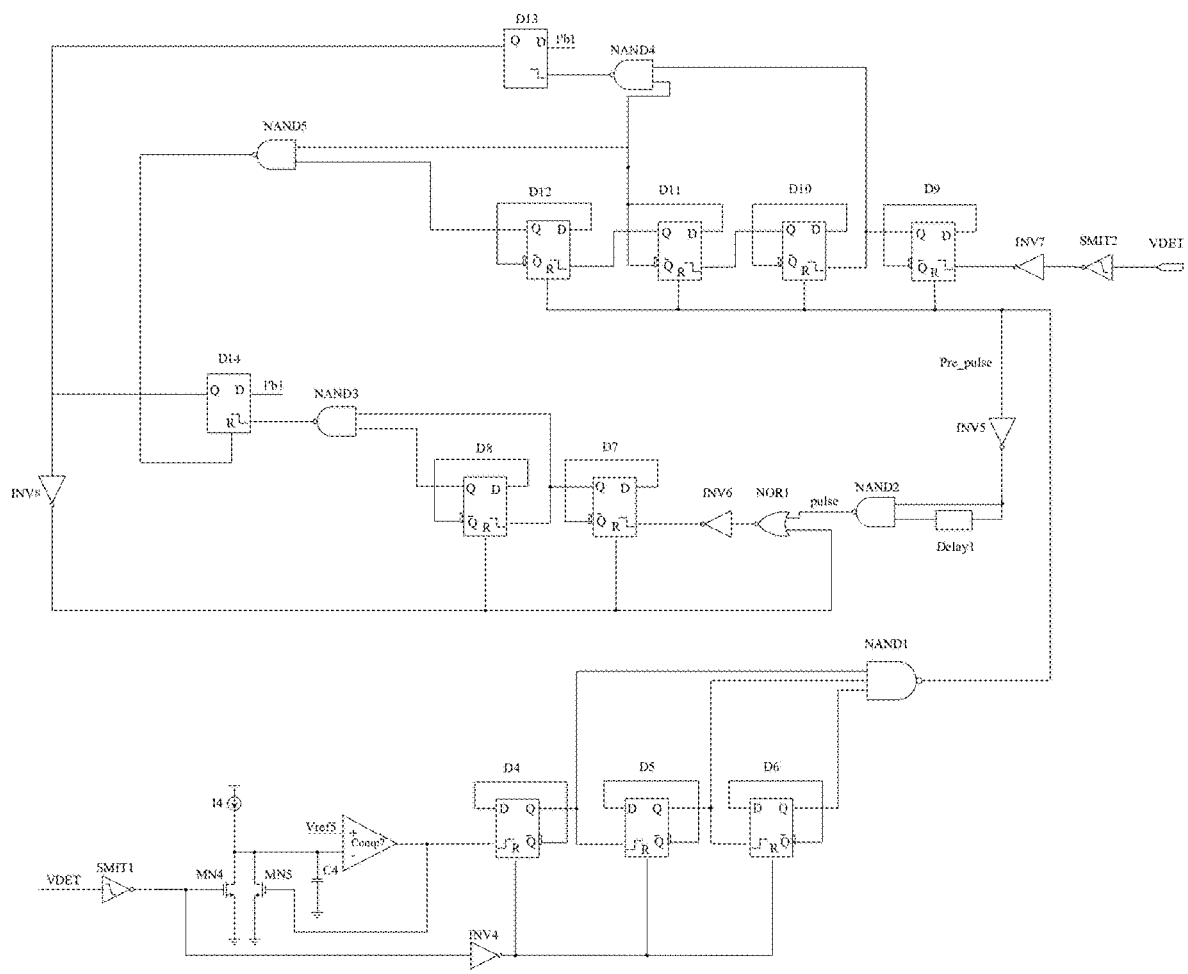
FIG. 7 schematically illustrates a structural diagram of a light-load detection circuit according to an embodiment.

FIG. 7 schematically illustrates a structural diagram of a light-load detection circuit according to an embodiment.

In some embodiments, the pre-pulse signal generation circuit includes a first Schmitt trigger, a fourth current source I4, a fourth NMOS transistor MN4, and a fifth NMOS transistor MN5, a fourth capacitor C4, a seventh comparator Comp7 and a first counter.

The first Schmitt trigger has an input terminal provided with the sampling voltage VDET, and an output terminal coupled to a gate of the fourth NMOS transistor MN4 and a control terminal of the first counter.

The fourth NMOS transistor MN4 has a drain coupled to a second terminal of the fourth current source I4 and a second input terminal of the seventh comparator Comp7, and a source grounded. The fourth current source I4 has a first terminal provided with a preset power supply voltage.

The fifth NMOS transistor MN5 has a gate coupled to an output terminal of the seventh comparator Comp7, a drain coupled to a second input terminal of the seventh comparator Comp7, and a source grounded.

The fourth capacitor C4 has a first terminal coupled to the second input terminal of the seventh comparator Comp7, and a second terminal grounded.

The seventh comparator Comp7 has a first input terminal provided with a fifth reference voltage Vref5, and an output terminal coupled to the gate of the fifth NMOS transistor MN5 and an input terminal of the first counter.

The first counter has a control terminal coupled to the output terminal of the first Schmitt trigger, and an output terminal coupled to the control terminal of the pulse signal generation circuit.

In some embodiments, a count value of the first counter is used to represent a time duration when the sampling voltage VDET retains a high level. When the count value of the first counter reaches the first preset value, a duration corresponding to the first preset value is the first duration. At this time, the pre-pulse signal generation circuit generates the pre-pulse signal.

As shown in FIG. 7, when the sampling voltage VDET continues to be high, the sampling voltage VDET is inverted by the first Schmitt trigger, and the gate of the fourth NMOS transistor MN4 is low, thus, the fourth NMOS transistor MN4 is turned off. The fourth current source I4 charges the fourth capacitor C4. When the voltage at the first terminal of the fourth capacitor C4 reaches the fifth reference voltage Vref5, the seventh comparator Comp7 outputs a low level. In this case, the fifth NMOS transistor MN5 is turned on, and charges accumulated on the fourth capacitor C4 are released. The output of the seventh comparator Comp7 is switched from a high level to a low level. The first counter may record the number of inversions of the seventh comparator Comp7. A count value of the first counter is increased by one once the seventh comparator Comp7 is inverted. When the count value of the first counter reaches the first preset value, the pre-pulse signal generation circuit generates the pre-pulse signal.

In some embodiments, the first counter may include a fourth inverter INV4, a fourth D flip-flop D4, a fifth D flip-flop D5, a sixth D flip-flop D6 and a first NAND gate circuit NAND1.

An input terminal of the fourth inverter INV4 is a control terminal of the first counter, and an output terminal of the fourth inverter INV4 is coupled to reset terminals of the fourth D flip-flop D4, the fifth D flip-flop D5 and the sixth D flip-flop D6.

A clock signal input terminal of the fourth D flip-flop D4 is the input terminal of the first counter, and is coupled to the output terminal of the seventh comparator Comp7. A D terminal of the fourth D flip-flop D4 is coupled to a Q NOT terminal of the fourth D flip-flop D4. A Q terminal of the fourth D flip-flop D4 is coupled to the clock signal input terminal of the fifth D flip-flop D5 and the first input terminal of the first NAND gate circuit NAND1.

A D terminal of the fifth D flip-flop D5 is coupled to a Q NOT terminal of the fifth D flip-flop D5, a Q terminal of the fifth D flip-flop D5 is coupled to a clock signal input terminal of the sixth D flip-flop D6, and a second input terminal of the first NAND gate circuit NAND1.

A D terminal of the sixth D flip-flop D6 is coupled to a Q NOT terminal of the sixth D flip-flop D6, and a Q terminal of the sixth D flip-flop D6 is coupled to a third input terminal of the first NAND gate circuit NAND1.

An output terminal of the third NAND gate circuit NAND3 is coupled to the output terminal of the first counter. The third NAND gate circuit NAND3 performs an NAND operation on the Q terminal output of the fourth D flip-flop D4, the Q terminal output of the fifth D flip-flop D5, and the Q terminal output of the sixth D flip-flop D6. When the Q terminal output of the fourth D flip-flop D4, the Q terminal output of the fifth D flip-flop D5, and the Q terminal output of the sixth D flip-flop D6 are all 1, the pre-pulse signal generation circuit generates the pre-pulse signal Pre_pulse.

It should be noted that the above structure of the first counter corresponds to an application scenario where the first preset value of the first counter is 7. When the Q terminal output of the fourth D flip-flop D4, the Q terminal output of the fifth D flip-flop D5, and the Q terminal output of the sixth D flip-flop D6 are all 1, it means the count value of the first counter reaches 7. In this case, the pre-pulse signal generation circuit generates the pre-pulse signal Pre_pulse.

In some embodiments, an effective state of the pre-pulse signal Pre_pulse is a low level.

In practice, the first counter may have other structures. For example, when the count value of the first counter is 3, it is determined that the count value of the first counter reaches the first preset value. In this case, the first counter may merely include the fourth D flip-flop D4 and the fifth D flip-flop D5.

The first preset value corresponding to the first counter may be other values, such as 3 or 15, or other values.

In some embodiments, the pulse signal generation circuit includes a fifth inverter INV5, a first delay circuit and a second NAND gate circuit NAND2.

The fifth inverter INV5 has an input terminal coupled to the input terminal of the pulse signal generation circuit, and an output terminal coupled to a first input terminal of the second NAND gate circuit NAND2 and a first terminal of the first delay circuit.

The first delay circuit has a second terminal coupled to a second input terminal of the second NAND gate circuit NAND2.

The second NAND gate circuit NAND2 has an output terminal coupled to the output terminal of the pulse signal generation circuit.

In some embodiments, the light-load signal generation circuit includes a sixth inverter INV6 and a second counter.

The sixth inverter INV6 has an input terminal which is the input terminal of the light-load signal generation circuit, and an output terminal coupled to an input terminal of the second counter.

The second counter has an output terminal coupled to the output terminal of the light-load signal generation circuit, and the light-load signal generation circuit is configured to generate and output the light-load signal when a count value of the second counter reaches a second preset value.

The second counter may include a seventh D flip-flop D7, an eighth D flip-flop D8, and a third NAND gate circuit NAND3.

A clock signal input terminal of the seventh D flip-flop D7 is coupled to the input terminal of the second counter, a D terminal of the seventh D flip-flop D7 is coupled to a Q NOT terminal of the seventh D flip-flop D7, and a Q terminal of the seventh D flip-flop D7 is coupled to a clock signal input terminal of the eighth D flip-flop D8 and a first input terminal of the third NAND gate circuit NAND3.

A D terminal of the eighth D flip-flop D8 is coupled to a Q NOT terminal of the eighth D flip-flop D8, and a Q terminal of the eighth D flip-flop D8 is coupled to a second input terminal of the third NAND gate circuit NAND3.

An output terminal of the third NAND gate circuit NAND3 is coupled to the output terminal of the second counter.

It should be noted that the above structure of the second counter corresponds to an application scenario where the second preset value corresponding to the second counter is 3. When the Q terminal output of the seventh D flip-flop D7 and the Q terminal output of the eighth D flip-flop D8 are both 1, it means that the count value of the second counter reaches 3. In this case, the light-load signal generation circuit generates and outputs a light-load signal.

It could be understood that, if the second preset value is another value, the structure of the second counter may be configured based on the second preset value, and is not limited to the structure of the second counter provided in the foregoing embodiments.

In some embodiments, the light-load signal generation circuit further includes a detection trigger sub-circuit having an input terminal provided with the sampling voltage VDET, a control terminal coupled to the output terminal of the pulse signal generation circuit, a first output terminal coupled to a control terminal of the second counter, and a second output terminal coupled to the output terminal of the light-load signal generation circuit; and the detection trigger sub-circuit is configured to output a first trigger signal to the control terminal of the second counter based on that the number of consecutive times that the sampling voltage is a low level reaches a third preset value.

In some embodiments, the detection trigger sub-circuit is further configured to output a second trigger signal, after detecting the generation of the light-load signal and when the number of consecutive times that the sampling voltage is a low level reaches a fourth preset value, so that the light-load signal generation circuit stops generating the light-load signal, i.e., to control the synchronous rectification control circuit to exit a light-load mode.

In some embodiments, the detection trigger sub-circuit includes a second Schmitt trigger, a seventh inverter INV7 and a third counter.

The second Schmitt trigger has an input terminal provided with the sampling voltage VDET, and an output terminal coupled to an input terminal of the seventh inverter INV7.

The seventh inverter has an output terminal coupled to an input terminal of the third counter.

The third counter has a control terminal coupled to the output terminal of the pre-pulse signal generation circuit, a first output terminal coupled to the control terminal of the second counter, and a second output terminal coupled to the output terminal of the light-load signal generation circuit.

In some embodiments, when the count value of the third counter reaches the third preset value, the first trigger signal is output to the control terminal of the second counter. When the generation of the light-load signal is detected, if the count value of the third counter reaches the fourth preset value, the second trigger signal is output to the output terminal of the light-load signal generation circuit.

In some embodiments, the third counter may include a ninth D flip-flop D9, a tenth D flip-flop D10, an eleventh D flip-flop D11, a twelfth D flip-flop D12, a thirteenth D flip-flop D13, a fourteenth D flip-flop D14, a fourth NAND gate circuit NAND4 and a fifth NAND gate circuit NAND5 and an eighth inverter INV8.

A clock signal input terminal of the ninth D flip-flop D9 is coupled to the input terminal of the third counter, a D terminal of the ninth D flip-flop D9 is coupled to a Q NOT terminal of the ninth D flip-flop D9, and a Q terminal of the ninth D flip-flop D9 is coupled to a clock signal input terminal of the tenth D flip-flop D10 and a first input terminal of the fourth NAND gate circuit NAND4.

A D terminal of the tenth D flip-flop D10 is coupled to a Q NOT terminal of the tenth D flip-flop D10, and a Q terminal of the tenth D flip-flop D10 is coupled to a clock signal input terminal of the eleventh D flip-flop D11.

A D terminal of the eleventh D flip-flop D11 is coupled to a Q NOT terminal of the eleventh D flip-flop D11, a second input terminal of the fourth NAND gate circuit NAND4, and a first input terminal of the fifth NAND gate circuit NAND5. A Q terminal of the eleventh D flip-flop D11 is coupled to a clock signal input terminal of the twelfth D flip-flop D12.

A D terminal of the twelfth D flip-flop D12 is coupled to a Q NOT terminal of the twelfth D flip-flop D12, and a Q terminal of the twelfth D flip-flop D12 is coupled to a second input terminal of the fifth NAND gate circuit NAND5.

A clock signal input terminal of the thirteenth D flip-flop D13 is coupled to an output terminal of the fourth NAND gate circuit NAND4, a D terminal of the thirteenth D flip-flop D13 is provided with a preset signal, and a Q terminal of the thirteenth D flip-flop D13 is coupled to an input terminal of the eighth inverter INV8, and an output terminal of the eighth inverter INV8 is coupled to a first output terminal of the third counter.

A clock signal input terminal of the fourteenth D flip-flop D14 is coupled to the output terminal of the third NAND gate circuit NAND3, a D terminal of the fourteenth D flip-flop D14 is provided with a preset signal, a reset terminal of the fourteenth D flip-flop D14 is coupled to an output terminal of the fifth NAND gate circuit NAND5, and a Q terminal of the fourteenth D flip-flop D14 is coupled to the output terminal of the light-load detection circuit.

In some embodiments, the detection trigger sub-circuit may include an NOR circuit NOR1. A first input terminal of the NOR gate circuit NOR1 is coupled to the output terminal of the second NAND gate circuit NAND2, a second input terminal of the NOR gate circuit NOR2 is coupled to the output terminal of the eighth inverter, and the output terminal of the NOR gate circuit NOR2 is coupled to the input terminal of the sixth inverter INV6.

It should be noted that the above-mentioned structure of the third counter corresponds to an application scenario where the third preset value is 5 and the fourth preset value is 12. If the third preset value is another value and/or the fourth preset value is another value, the structure of the third counter may be adjusted accordingly.

Figure 8:
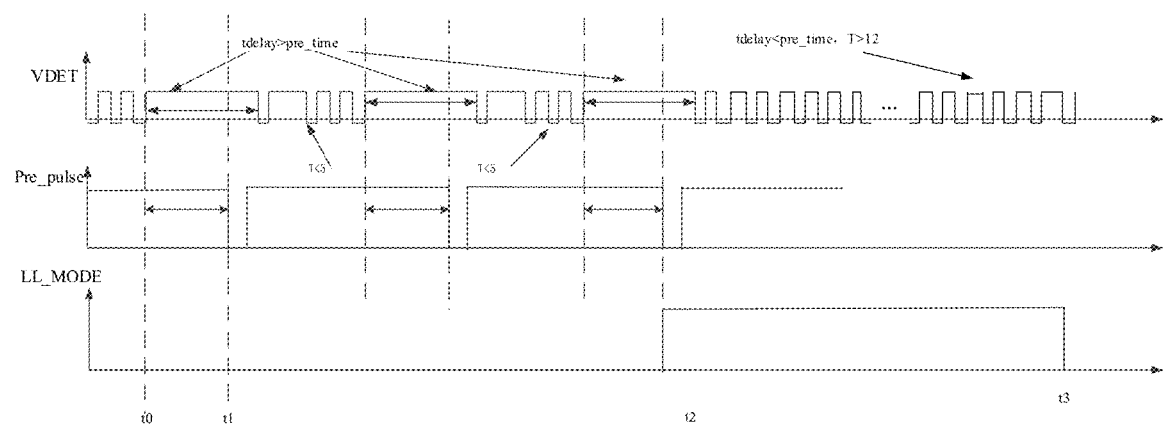
FIG. 8 schematically illustrates a waveform diagram of a light-load detection circuit during operation according to an embodiment.

FIG. 8 schematically illustrates a waveform diagram of a light-load detection circuit during operation according to an embodiment.

Referring to FIG. 8, within t0 to t1, the sampling voltage VDET is high for a time period tdelay which exceeds the first preset time pre_time, and thus an effective pre-pulse signal Pre_pulse is generated. Within t1 to t2, the pre-pulse signal Pre_pulse is accumulated three times in succession, and the number T of times of detecting that the sampling voltage VDET is a low level within t1 to t2 is smaller than 5, thus, the light-load detection circuit generates a high level light-load signal LL_MODE.

Within t2 to t3, the number T of times of detecting that the sampling voltage VDET is low is greater than 12, thus, the light-load mode is exited, and the light-load detection circuit stops generating the light-load signal.

Those skilled in the art can understand that all of or a portion of the processes in the method provided in the above embodiments can be implemented by related hardware with instruction of program. The program may be stored in a computer readable storage medium. The computer readable storage medium may include a Read-Only Memory (ROM), a Random Access Memory (RAM), a magnetic disk or an optical disk.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A synchronous rectification control circuit, comprising a sampling circuit, a turn-on comparison circuit, a turn-off comparison circuit, a drive control circuit, and an anti-accidental turn-on circuit, wherein the sampling circuit has a first terminal coupled to a first output terminal of a transformer, and is configured to obtain a sampling voltage;

the anti-accidental turn-on circuit has a first input terminal coupled to a second terminal of the sampling circuit, and is configured to generate and output a turn-on enable signal based on the sampling voltage;

the turn-on comparison circuit has a first input terminal coupled to the second terminal of the sampling circuit, and a second input terminal coupled to an output terminal of the anti-accidental turn-on circuit, and is configured to generate and output a turn-on signal when receiving the turn-on enable signal;

the turn-off comparison circuit has an input terminal coupled to the second terminal of the sampling circuit, and is configured to generate and output a turn-off signal based on the sampling signal; and the drive control circuit has a first input terminal coupled to an output terminal of the turn-on comparison circuit, and a second input terminal coupled to an output terminal of the turn-off comparison circuit, and is configured to generate and output a corresponding drive signal to a power switch transistor coupled to the first output terminal of the transformer based on the turn-on signal and the turn-off signal, to control a switching state of the power switch transistor.

2. The synchronous rectification control circuit according to claim 1, wherein the anti-accidental turn-on circuit comprises a first transmission gate circuit, a second transmission gate circuit, and a first-stage sub-circuit, wherein the first transmission gate circuit has an input terminal grounded, an output terminal coupled to a second input terminal of the first-stage sub-circuit and an output terminal of the second transmission gate circuit, a first control terminal coupled to a second control terminal of the second transmission gate circuit, and a second control terminal coupled to a first control terminal of the second transmission gate circuit;

the second transmission gate circuit has an input terminal provided with a first reference voltage, and an output terminal coupled to the second input terminal of the first stage sub-circuit, wherein a first control signal of the first control terminal of the first transmission gate circuit and a second control signal of the second control terminal of the second transmission gate circuit are determined based on the first reference voltage and the sampling voltage; and the first-stage sub-circuit has a first input terminal coupled to the first input terminal of the anti-accidental turn-on circuit, and an output terminal coupled with the output terminal of the anti-accidental turn-on circuit.

3. The synchronous rectification control circuit according to claim 2, wherein the first-stage sub-circuit comprises a first comparator, a first inverter, a first NMOS transistor, a first current source, a first capacitor, a fourth comparator and a first D flip-flop, wherein the first comparator has a first input terminal which is the first input terminal of the first-stage sub-circuit, a second input terminal which is the second input terminal of the first-stage sub-circuit, and an output terminal coupled to an input terminal of the first inverter, the first control terminal of the first transmission gate circuit, and the second control terminal of the second transmission gate circuit;

the first inverter has an output terminal coupled to a gate of the first NMOS transistor, the second control terminal of the first transmission gate circuit, and the first control terminal of the second transmission gate circuit;

the first NMOS transistor has a drain coupled to a second terminal of the first current source, a first terminal of the first capacitor, and a second input terminal of the fourth comparator, and a source grounded;

the first capacitor has a second terminal grounded;

the first current source has a first terminal provided with a preset power supply voltage;

the fourth comparator has a first input terminal provided with a second reference voltage, and an output terminal configured to generate a first turn-on enable sub-signal; and the first D flip-flop has a clock signal input terminal coupled to the output terminal of the fourth comparator, a D terminal provided with a preset signal, and a Q terminal coupled to the output terminal of the first stage sub-circuit, wherein the first turn-on enable sub-signal is output via the Q terminal to obtain the turn-on enable signal.

4. The synchronous rectification control circuit according to claim 2, wherein the anti-accidental turn-on circuit has the second input terminal coupled to the first output terminal of the transformer, and a third input terminal coupled to a second output terminal of the transformer, and is configured to determine to generate the turn-on enable signal based on output voltages of the first output terminal and the second output terminal of the transformer.

5. The synchronous rectification control circuit according to claim 4, wherein the anti-accidental turn-on circuit comprises a second-stage sub-circuit, a first voltage dividing resistor, a second voltage dividing resistor, a third voltage dividing resistor, a fourth voltage dividing resistor, and OR gate circuit,
- wherein the first voltage dividing resistor has a first terminal coupled to the second input terminal of the anti-accidental turn-on circuit, and a second terminal coupled to the first input terminal of the second stage sub-circuit, and a first terminal of the second voltage dividing resistor;
- the second voltage dividing resistor has a second terminal grounded;
- the third voltage dividing resistor has a first terminal coupled to the third input terminal of the anti-accidental turn-on circuit, and a second terminal coupled to a first terminal of the fourth voltage dividing resistor, wherein a voltage at the second terminal of the third voltage dividing resistor is a first dividing voltage;
- the fourth voltage dividing resistor has a second terminal grounded;
- the second-stage sub-circuit has a second input terminal provided with the first dividing voltage, and an output terminal coupled to a second input terminal of the OR gate circuit; and
- the OR gate circuit has a first input terminal coupled to the output terminal of the second-stage sub-circuit, and an output terminal coupled to the output terminal of the anti-accidental turn-on circuit.

6. The synchronous rectification control circuit according to claim 5, wherein the second-stage sub-circuit comprises a second comparator, a second inverter, a second NMOS transistor, a second current source, a second capacitor, a fifth comparator and a second D flip-flop,
- wherein the second comparator has a first input terminal which is the first input terminal of the second-stage sub-circuit, and a second input terminal which is the second input terminal of the second-stage sub-circuit;
- the second inverter has an input terminal coupled to an output terminal of the second comparator;
- the second NMOS transistor has a gate coupled to an output terminal of the second inverter, a drain coupled to a second terminal of the second current source, a second input terminal of the fifth comparator, and a first terminal of the second capacitor, and a source grounded;
- the second current source has a first terminal provided with a preset power supply voltage;
- the second capacitor has a second terminal grounded;
- the fifth comparator has a first input terminal provided with a third reference voltage; and
- the second D flip-flop has a clock signal input terminal coupled to an output terminal of the fifth comparator, a D terminal provided with a preset signal, and a Q terminal coupled to the output terminal of the second stage sub-circuit.

7. The synchronous rectification control circuit according to claim 5, wherein the anti-accidental turn-on circuit further comprises a third-stage sub-circuit and a fifth voltage dividing resistor, and the OR gate circuit further has a third input terminal,
- wherein the fifth voltage dividing resistor has a first terminal coupled to the second terminal of the fourth voltage dividing resistor, and a second terminal grounded, wherein a voltage at the first terminal of the fifth voltage dividing resistor is the second dividing voltage; and
- the third-stage sub-circuit has a first input terminal coupled to the second terminal of the first voltage dividing resistor, a second input terminal provided with the second dividing voltage, and an output terminal coupled to the third input terminal of the OR gate circuit.

8. The synchronous rectification control circuit according to claim 7, wherein the third-stage sub-circuit comprises a third comparator, a third inverter, a third NMOS transistor, a third current source, a third capacitor, a sixth comparator and a third D flip-flop,
- wherein the third comparator has a first input terminal which is the first input terminal of the third-stage sub-circuit, and a second input terminal which is the second input terminal of the third-stage sub-circuit;
- the third inverter has an input terminal coupled to an output terminal of the third comparator;
- the third NMOS transistor has a gate coupled to the output terminal of the third inverter, a drain coupled to a second terminal of the third current source, a second input terminal of the sixth comparator, and a first terminal of the third capacitor, and a source grounded;
- the third current source has a first terminal provided with a preset power supply voltage;
- the third capacitor has a second terminal grounded;
- the sixth comparator has a first input terminal provided with a fourth reference voltage; and
- the third D flip-flop has a clock signal input terminal coupled to an output terminal of the sixth comparator, a D terminal provided with a preset signal, and a Q terminal coupled to the output terminal of the third-stage sub-circuit.

9. The synchronous rectification control circuit according to claim 1, further comprising a light-load detection circuit,
- wherein the light-load detection circuit has an input terminal coupled to the second terminal of the sampling circuit, and a first output terminal coupled to the third input terminal of the turn-on comparison circuit, the fourth input terminal of the anti-accidental turn-on circuit, and the second input terminal of the turn-off comparison circuit, and is configured to determine whether to generate a light-load signal to the turn-on comparison circuit, the anti-accidental turn-on circuit and the turn-off comparison circuit based on a switching frequency of the sampling voltage; and
- the turn-on comparison circuit, the anti-accidental turn-on circuit and the turn-off comparison circuit enter a dormant state after receiving the light-load signal.

10. The synchronous rectification control circuit according to claim 9, wherein the light-load detection circuit comprises a pre-pulse signal generation circuit, a pulse signal generation circuit and a light-load signal generation circuit,
- wherein the pre-pulse signal generation circuit has an input terminal coupled to the second terminal of the sampling circuit, and is configured to generate and output a pre-pulse signal based on that a duration of a high level of the sampling voltage reaches a first preset duration;
- the pulse signal generation circuit has an input terminal coupled to the input terminal of the pre-pulse signal generation circuit, and is configured to convert the pre-pulse signal into a pulse signal; and
- the light-load signal generation circuit has an input terminal coupled to an output terminal of the pre-pulse signal generation circuit, and is configured to generate and output the light-load signal based on that the number of times of receiving the pulse signal reaches a second preset value.

11. The synchronous rectification control circuit according to claim 10, wherein the pre-pulse signal generation circuit comprises a first Schmitt trigger, a fourth current source, a fourth NMOS transistor, a fifth NMOS transistor, a fourth capacitor, a seventh comparator and a first counter, where the first Schmitt trigger has an input terminal provided with the sampling voltage, and an output terminal coupled to a gate of the fourth NMOS transistor and a control terminal of the first counter;
the fourth NMOS transistor has a drain coupled to a second terminal of the fourth current source and a second input terminal of the seventh comparator, and a source grounded;
the fourth current source has a first terminal provided with a preset power supply voltage;
the fifth NMOS transistor has a gate coupled to an output terminal of the seventh comparator, a drain coupled to a second input terminal of the seventh comparator, and a source grounded;
the fourth capacitor has a first terminal coupled to the second input terminal of the seventh comparator, and a second terminal grounded;
the seventh comparator has a first input terminal provided with a fifth reference voltage, and an output terminal coupled to an input terminal of the first counter;
the first counter has an output terminal coupled to the output terminal of the pre-pulse signal generation circuit; and
the pre-pulse signal generation circuit is configured to output the pre-pulse signal when a count value of the first counter reaches a first preset value.

12. The synchronous rectification control circuit according to claim 10, wherein the pulse signal generation circuit comprises a fifth inverter, a first delay circuit and a second NAND gate circuit,
wherein the fifth inverter has an input terminal coupled to the input terminal of the pulse signal generation circuit, and an output terminal coupled to a first input terminal of the second NAND gate circuit and a first terminal of the first delay circuit;
the first delay circuit has a second terminal coupled to a second input terminal of the second NAND gate circuit; and
the second NAND gate circuit has an output terminal coupled to the output terminal of the pulse signal generation circuit.

13. The synchronous rectification control circuit according to claim 10, wherein the light-load signal generation circuit comprises a sixth inverter and a second counter,
wherein the sixth inverter has an input terminal which is the input terminal of the light-load signal generation circuit, and an output terminal coupled to an input terminal of the second counter;
the second counter has an output terminal coupled to the output terminal of the light-load signal generation circuit; and
the light-load signal generation circuit is configured to generate and output the light-load signal when a count value of the second counter reaches a second preset value.

14. The synchronous rectification control circuit according to claim 13, wherein the light-load signal generation circuit further comprises a detection trigger sub-circuit having an input terminal provided with the sampling voltage, a control terminal coupled to the output terminal of the pulse signal generation circuit, a first output terminal coupled to a control terminal of the second counter, and a second output terminal coupled to the output terminal of the light-load signal generation circuit; and
the detection trigger sub-circuit is configured to output a first trigger signal to the control terminal of the second counter based on that the number of consecutive times that the sampling voltage is a low level reaches a third preset value, and output a second trigger signal, after detecting the generation of the light-load signal and when the number of consecutive times that the sampling voltage is a low level reaches a fourth preset value, so that the light-load signal generation circuit stops generating the light-load signal.

15. The synchronous rectification control circuit according to claim 14, wherein the detection trigger sub-circuit comprises a second Schmitt trigger, a seventh inverter and a third counter,
wherein the second Schmitt trigger has an input terminal provided with the sampling voltage, and an output terminal coupled to an input terminal of the seventh inverter;
the seventh inverter has an output terminal coupled to an input terminal of the third counter; and
the third counter has a control terminal coupled to the output terminal of the pre-pulse signal generation circuit, a first output terminal which is the first output terminal of the detection trigger sub-circuit, and a second output terminal which is the second output terminal of the detection trigger sub-circuit.

16. A switching power supply system, comprising a synchronous rectification control circuit which comprises a sampling circuit, a turn-on comparison circuit, a turn-off comparison circuit, a drive control circuit, and an anti-accidental turn-on circuit,
wherein the sampling circuit has a first terminal coupled to a first output terminal of a transformer, and is configured to obtain a sampling voltage;
the anti-accidental turn-on circuit has a first input terminal coupled to a second terminal of the sampling circuit, and is configured to generate and output a turn-on enable signal based on the sampling voltage;
the turn-on comparison circuit has a first input terminal coupled to the second terminal of the sampling circuit, and a second input terminal coupled to an output terminal of the anti-accidental turn-on circuit, and is configured to generate and output a turn-on signal when receiving the turn-on enable signal;
the turn-off comparison circuit has an input terminal coupled to the second terminal of the sampling circuit, and is configured to generate and output a turn-off signal based on the sampling signal; and
the drive control circuit has a first input terminal coupled to an output terminal of the turn-on comparison circuit, and a second input terminal coupled to an output terminal of the turn-off comparison circuit, and is configured to generate and output a corresponding drive signal to a power switch transistor coupled to the first output terminal of the transformer based on the turn-on signal and the turn-off signal, to control a switching state of the power switch transistor.

17. The switching power supply system according to claim 16, wherein the anti-accidental turn-on circuit comprises a first transmission gate circuit, a second transmission gate circuit, and a first-stage sub-circuit,
wherein the first transmission gate circuit has an input terminal grounded, an output terminal coupled to a second input terminal of the first-stage sub-circuit and an output terminal of the second transmission gate circuit, a first control terminal coupled to a second control terminal of the second transmission gate circuit, and a second control terminal coupled to a first control terminal of the second transmission gate circuit;

the second transmission gate circuit has an input terminal provided with a first reference voltage, and an output terminal coupled to the second input terminal of the first stage sub-circuit, wherein a first control signal of the first control terminal of the first transmission gate circuit and a second control signal of the second control terminal of the first transmission gate circuit are determined based on the first reference voltage and the sampling voltage; and the first-stage sub-circuit has a first input terminal coupled to the first input terminal of the anti-accidental turn-on circuit, and an output terminal coupled with the output terminal of the anti-accidental turn-on circuit.

18. The switching power supply system according to claim 17, wherein the first-stage sub-circuit comprises a first comparator, a first inverter, a first NMOS transistor, a first current source, a first capacitor, a fourth comparator and a first D flip-flop, wherein the first comparator has a first input terminal which is the first input terminal of the first-stage sub-circuit, a second input terminal which is the second input terminal of the first-stage sub-circuit, and an output terminal coupled to an input terminal of the first inverter, the first control terminal of the first transmission gate circuit, and the second control terminal of the second transmission gate circuit;

the first inverter has an output terminal coupled to a gate of the first NMOS transistor, the second control terminal of the first transmission gate circuit, and the first control terminal of the second transmission gate circuit;

the first NMOS transistor has a drain coupled to a second terminal of the first current source, a first terminal of the first capacitor, and a second input terminal of the fourth comparator, and a source grounded;

the first capacitor has a second terminal grounded;

the first current source has a first terminal provided with a preset power supply voltage;

the fourth comparator has a first input terminal provided with a second reference voltage, and an output terminal configured to generate a first turn-on enable sub-signal; and the first D flip-flop has a clock signal input terminal coupled to the output terminal of the fourth comparator, a D terminal provided with a preset signal, and a Q terminal coupled to the output terminal of the first stage sub-circuit, wherein the first turn-on enable sub-signal is output via the Q terminal to obtain the turn-on enable signal.

19. The switching power supply system according to claim 16, wherein the synchronous rectification control circuit further comprises a light-load detection circuit, wherein the light-load detection circuit has an input terminal coupled to the second terminal of the sampling circuit, and a first output terminal coupled to the third input terminal of the turn-on comparison circuit, the fourth input terminal of the anti-accidental turn-on circuit, and the second input terminal of the turn-off comparison circuit, and is configured to determine whether to generate a light-load signal to the turn-on comparison circuit, the anti-accidental turn-on circuit and the turn-off comparison circuit based on a switching frequency of the sampling voltage; and the turn-on comparison circuit, the anti-accidental turn-on circuit and the turn-off comparison circuit enter a dormant state after receiving the light-load signal.

20. The switching power supply system according to claim 19, wherein the light-load detection circuit comprises a pre-pulse signal generation circuit, a pulse signal generation circuit and a light-load signal generation circuit, wherein the pre-pulse signal generation circuit has an input terminal coupled to the second terminal of the sampling circuit, and is configured to generate and output a pre-pulse signal based on that a duration of a high level of the sampling voltage reaches a first preset duration;

the pulse signal generation circuit has an input terminal coupled to the input terminal of the pre-pulse signal generation circuit, and is configured to convert the pre-pulse signal into a pulse signal; and the light-load signal generation circuit has an input terminal coupled to an output terminal of the pre-pulse signal generation circuit, and is configured to generate and output the light-load signal based on that the number of times of receiving the pulse signal reaches a second preset value.

* * * * *